127,532

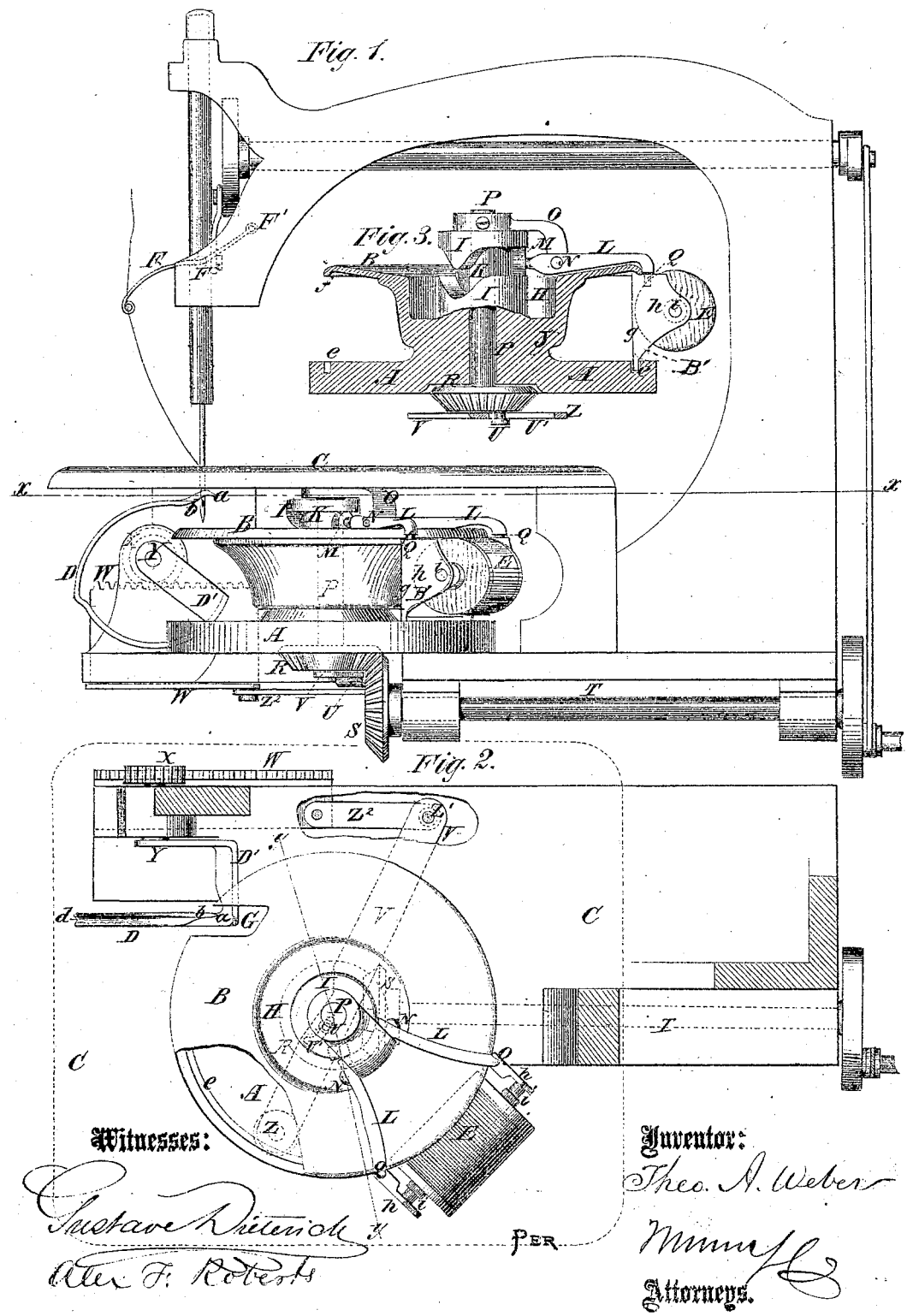

UNITED STATES PATENT OFFICE.

THEODORE A. WEBER, OF NEW YORK, N. Y., ASSIGNOR TO LEBBEUS W. LATHROP, OF SAME PLACE.

IMPROVEMENT IN SEWING-MACHINES.

Specification forming part of Letters Patent No. 127,532, dated June 4, 1872.

Specification describing a new and useful Improvement in Sewing-Machines, invented by THEODORE A. WEBER, of the city, county, and State of New York.

My invention consists of an improved arrangement of apparatus for working a spool-carrier in a continuous rotary course.

Figure 1 is a side elevation of so much of a machine as is necessary to show my improvement. Fig. 2 is a horizontal section, and Fig. 3 is a section, of Fig. 2 on the line $yy$.

Similar letters of reference indicate corresponding parts.

A and B are two horizontal circular ways for a spool-carrier, B', arranged under the plate C of the machine in such manner that said carrier passes under the needle or nearly so at one part of its revolution, and said needle comes down near the peripheries of said ways. D is a large nearly-circular looper working in a vertical plane. Its point $a$ passes between the thread and needle at the proper times, and takes the thread around said point at $b$ and over its back in the groove $d$ to open the loop for the spool E and its carrier B' to pass through. This loop-opener has an oscillatory movement, and after the spool has passed through the loop its motion is reversed, and the loop is cast off to be drawn up by the take-up F. The disk B, constituting the upper way, is opened at G, in front of the needle, to allow the loop-opener to reach far enough beyond the track to open the loop wide enough to clear the spool and its carrier properly. In this example the track or way consists of two circular grooves, $ef$, the one $e$ in the upper upper side of the disk A, and the other in the lower side of disk B, the said disks being connected by a central boss, J, and the lower one is attached to the frame of the machine. The carrier consists of a curved plate, $g$, fitted in said grooves at its edges, and having an arm, $h$, at each end projecting outwardly to support centers on which the spool is mounted, but said ways and carrier may be constructed in any approved or equivalent manner. The upper one and the central boss J have a large annular recess, H, in which is a vertical hub, I, which rises somewhat above it, and has a cam-groove, K, in which the inner ends of the spool-carrier drivers L, with friction-rollers M, work, to lift them up to pass the thread of the loop as the carrier goes through, said drivers being mounted at N on an arm, O, projecting from the top of a shaft, P, rising up through the axis of the way, and having vertical points Q at the outer ends, which come down in holes in the top of the carrier to engage and drive it. The cam-groove is so shaped that the driver in advance rises up, passes the thread, and goes down and engages the carrier again before the hinder driver leaves it. Said hinder driver then operates in the same way. The vertical shaft F extends through the disks below, and gears, by bevel-wheels R S, with a shaft, T, which is driven by the belt. The loop-opener is also driven by this shaft T through the medium of a wrist-pin, U, on wheel R, sliding toothed bar W, pinion X, and shaft Y, the said lever V being pivoted to a support at Z, and connected to the toothed bar W, at $Z^1$, by a link, $Z^2$, and having the said wrist-pin U connected to it in a slot, U', and the toothed bar W being arranged in suitable guides for reciprocating. The loop-opener is connected to the inner end of the shaft D by a bent bar D'.

In consequence of the large loop-opener used it is necessary to have a take-up of larger than ordinary sweep; consequently, I have provided a long wire, F, with the eye for the thread in one end, and the other end pivoted to the arm at $F^1$, and connected to the needle-bar $F^2$, between the two said extremes, in such manner as to give the necessary sweep.

Having thus described my invention, I claim as new and desire to secure by Letters Patent—

1. A spool-carrier and horizontal circular open or notched ways therefor, combined with the needle and loop-opener, and all constructed and operating substantially in the manner described.

2. The combination of the spool-carrier circular way, drivers L, stationary cam-grooved hub I, and a continuously-revolving shaft P, substantially as specified.

THEODORE A. WEBER.

Witnesses:
T. B. MOSHER,
GEO. W. MABEE.